United States Patent [19]

Lopez et al.

[11] Patent Number: 5,178,749

[45] Date of Patent: * Jan. 12, 1993

[54] CATALYTIC PROCESS FOR TREATING HEAVY OILS

[75] Inventors: Jaime Lopez, Benicia; Thomas P. Snyder, Richmond; Byron G. Spars, Mill Valley, all of Calif.

[73] Assignee: Chevron Research and Technology Company, San Francisco, Calif.

[*] Notice: The portion of the term of this patent subsequent to Nov. 17, 2009 has been disclaimed.

[21] Appl. No.: 586,622

[22] Filed: Sep. 21, 1990

Related U.S. Application Data

[63] Continuation-in-part of Ser. No. 548,157, Jul. 5, 1990, and a continuation-in-part of Ser. No. 388,790, Aug. 2, 1989, Pat. No. 4,970,190, and a continuation-in-part of Ser. No. 252,839, Sep. 30, 1988, abandoned, and a continuation-in-part of Ser. No. 275,235, Nov. 22, 1988, abandoned, said Ser. No. 388,790, is a continuation-in-part of Ser. No. 527,414, Aug. 29, 1983, Pat. No. 4,557,821, said Ser. No. 252,839, is a continuation-in-part of Ser. No. 941,456, Dec. 15, 1986, Pat. No. 4,857,496, which is a continuation-in-part of Ser. No. 767,767, Aug. 21, 1985, abandoned, which is a continuation-in-part of Ser. No. 527,414, Aug. 29, 1983, Pat. No. 4,557,821, said Ser. No. 275,235, is a continuation-in-part of Ser. No. 767,822, Aug. 21, 1985, abandoned, which is a continuation-in-part of Ser. No. 527,414, Aug. 29, 1983, Pat. No. 4,551,821.

[51] Int. Cl.[5] .................... C10G 47/00; C10G 45/04; C10G 29/04; C10G 47/02
[52] U.S. Cl. .................. 208/58; 208/216 R; 208/217; 208/251 H; 208/253; 208/210; 208/211; 208/108
[58] Field of Search ............ 208/216 R, 217, 251 H, 208/253, 58, 210, 211, 108, 215

[56] References Cited

U.S. PATENT DOCUMENTS

| | | | |
|---|---|---|---|
| 4,192,735 | 3/1980 | Aldridge et al. | 208/112 |
| 4,226,742 | 10/1980 | Bearden, Jr. et al. | 252/431 |
| 4,243,553 | 1/1981 | Naumann et al. | 252/439 |
| 4,243,554 | 1/1981 | Naumann et al. | 252/439 |
| 4,285,804 | 8/1981 | Jacquin et al. | 208/48 |
| 4,303,634 | 12/1981 | Gatsis | 423/561 |
| 4,430,442 | 2/1984 | Sawyer et al. | 502/220 |
| 4,430,443 | 2/1984 | Seiver et al. | 502/220 |
| 4,431,747 | 2/1984 | Seiver et al. | 502/220 |
| 4,435,278 | 3/1984 | Chen | 208/251 H |
| 4,508,847 | 4/1985 | Chianelli et al. | 502/200 |
| 4,514,517 | 4/1985 | Ho et al. | 502/220 |
| 4,528,089 | 7/1985 | Pecoraro et al. | 208/216 R |
| 4,544,481 | 10/1985 | Seiver et al. | 208/215 |
| 4,548,710 | 10/1985 | Simpson | 208/216 |
| 4,557,821 | 12/1985 | Lopez et al. | 208/143 |
| 4,568,449 | 2/1986 | Angmorter et al. | 208/215 |
| 4,581,125 | 4/1986 | Stiefel et al. | 208/108 |
| 4,592,827 | 6/1986 | Galiasso et al. | 208/59 |
| 4,595,672 | 6/1986 | Ho et al. | 502/219 |
| 4,650,563 | 3/1987 | Jacobson et al. | 208/108 |
| 4,705,619 | 11/1987 | McCandlish et al. | 208/112 |
| 4,710,486 | 12/1987 | Lopez et al. | 502/219 |
| 4,740,491 | 4/1988 | Wise et al. | 502/216 |
| 4,755,496 | 7/1988 | Ho et al. | 502/165 |
| 4,765,882 | 8/1988 | Aldridge et al. | 208/59 |

*Primary Examiner*—Asok Pal
*Assistant Examiner*—Nhat Phan

[57] ABSTRACT

The hydroprocessing of heavy oils is improved by the use of a high activity slurry catalyst prepared by sulfiding an aqueous Group VIB metal compound with a gas containing hydrogen sulfide to a dosage greater than 8 SCF of hydrogen sulfide per pound of Group VIB metal. After introducing the slurry catalyst into the heavy oil, and subjecting the mixture to elevated temperatures and partial pressures of hydrogen, the mixture is treated in a fixed or ebullated bed of hydrodesulfurization/hydrodemetalation catalyst under hydroprocessing conditions.

24 Claims, 2 Drawing Sheets

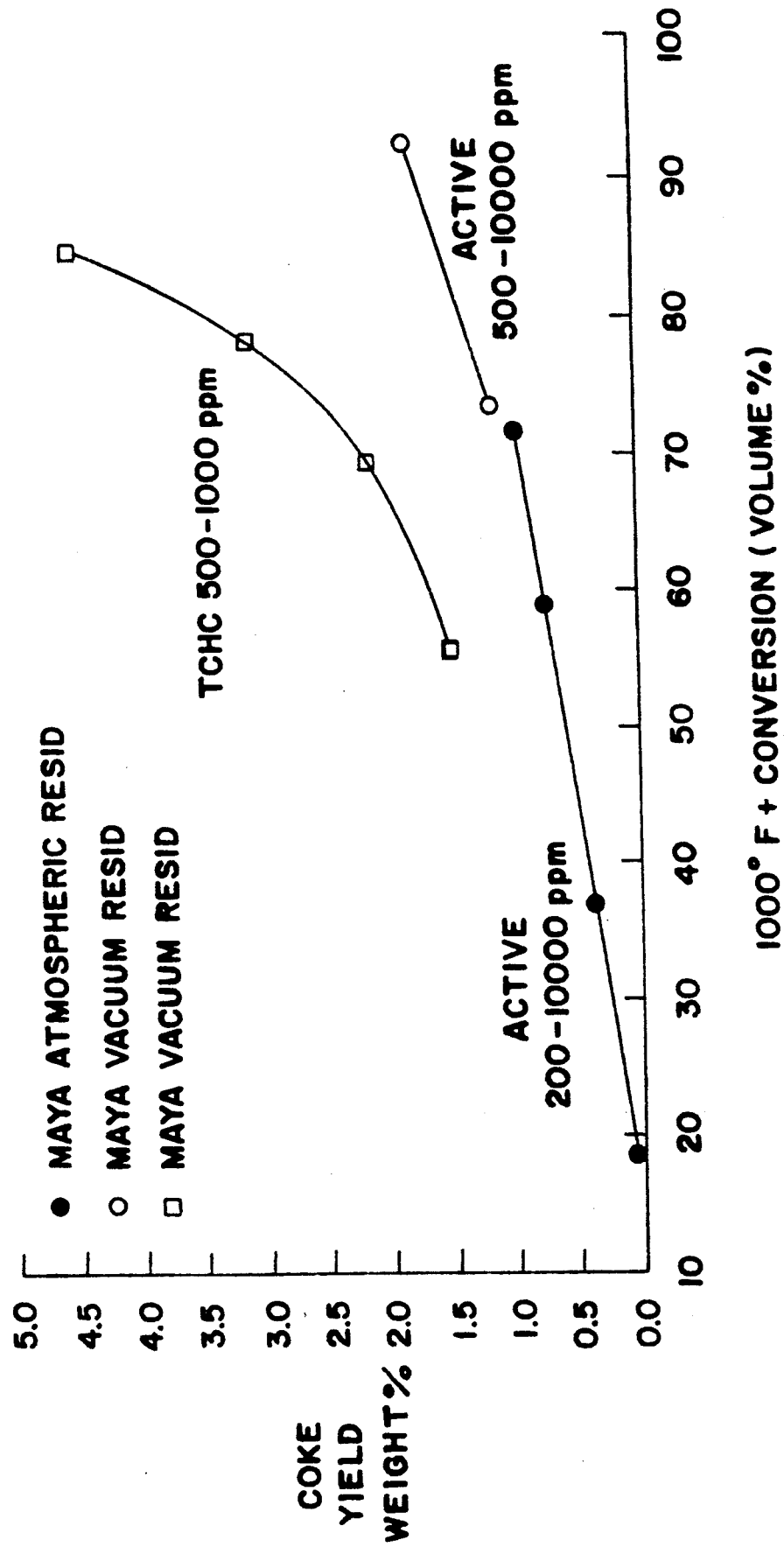

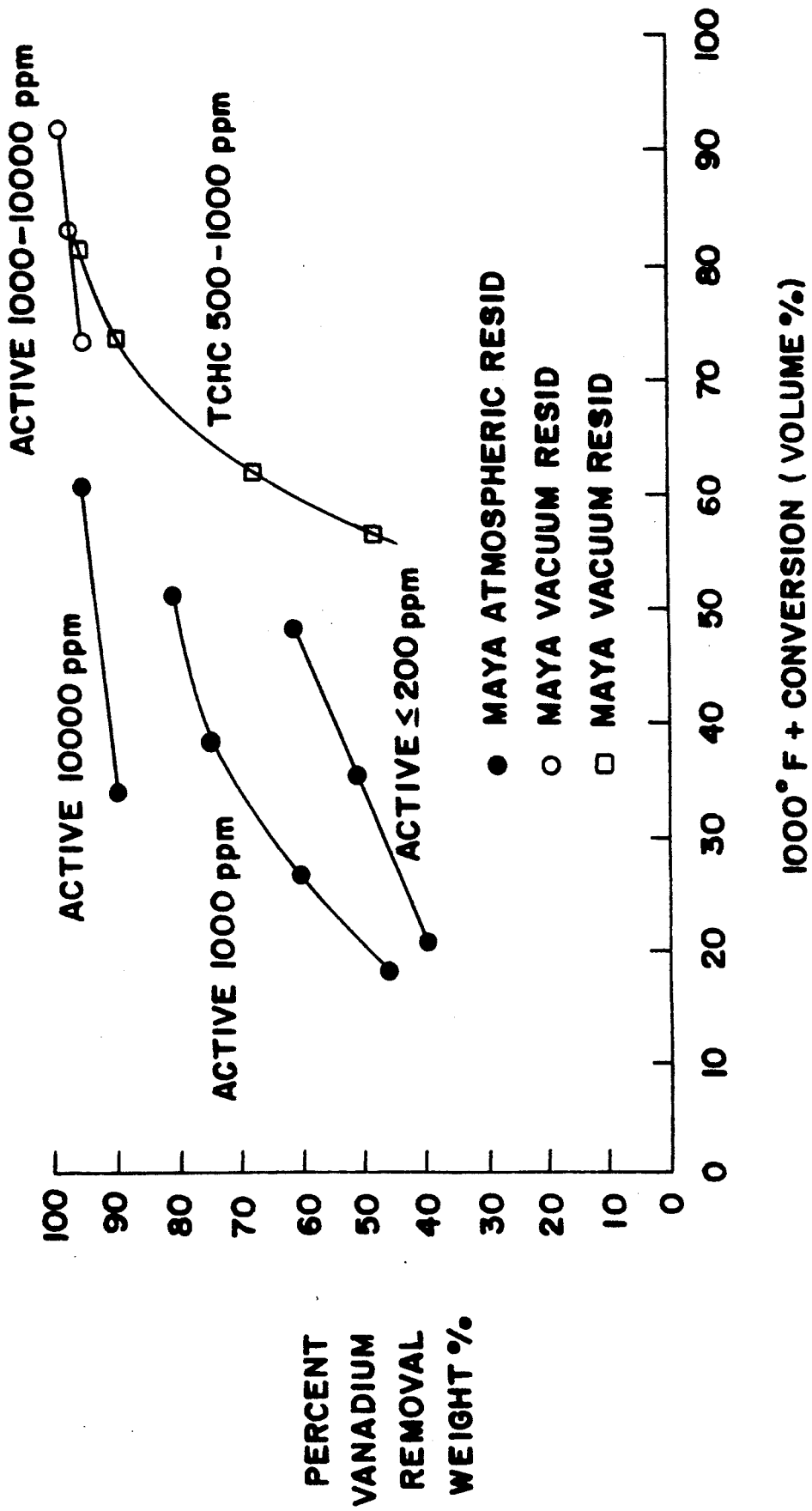
FIG_2

CATALYTIC PROCESS FOR TREATING HEAVY OILS

CROSS REFERENCES TO RELATED APPLICATIONS

This application is a continuation-in-part of U.S. Ser. No. 548,157, filed Jul. 5, 1990. This application is also a continuation-in-part of U.S. Ser. No. 388,790 filed Aug. 2, 1989, (now U.S. Pat. No. 4,970,190) which is a continuation-in-part of U.S. Ser. No. 527,414 filed Aug. 29, 1983 (now U.S. Pat. No. 4,557,821). This application is also a continuation-in-part of U.S. Ser. No. 252,839 filed Sep. 30, 1988,(now abandoned) which is a continuation-in-part of U.S. Ser. No. 941,456 filed Dec. 15, 1986 (now U.S. Pat. No. 4,857,496), which is a continuation in-part of U.S. Ser. No. 767,767 filed Aug. 21, 1985 (abandoned) which is a continuation-in-part of U.S. Ser. No. 527,414 filed Aug. 29, 1983 (now U.S. Pat. No. 4,557,821). This application is also a continuation-in-part of U.S. Ser. No. 275,235 filed Nov. 22, 1988, (now abandoned) which is a continuation-in-part of U.S. Ser. No. 767,822 filed Aug. 21, 1985 (abandoned) which is a continuation-in-part of U.S. Ser. No. 527,414 filed Aug. 29, 1983 (now U.S. Pat. No. 4,557,821). Related applications include U.S. Ser. No. 767,760 filed Aug. 21, 1985 (now U.S. Pat. No. 4,824,821) also a continuation-in-part of U.S. Ser. No. 527,414 filed Aug. 29, 1983; U.S. Ser. No. 767,768 filed Aug. 21, 1985 (now U.S. Pat. No. 4,710,486), also a continuation-in-part of U.S. Ser. No. 527,414 filed Aug. 29, 1983; and U.S. Ser. No. 767,821 filed Aug. 21, 1985 (now U.S. Pat. No. 4,762,812), also a continuation-in-part of U.S. Ser. No. 527,414 filed Aug. 29, 1983.

BACKGROUND OF THE INVENTION

This invention relates to the catalytic hydroprocessing of heavy hydrocarbon oils including crude oils, heavy crude oils and residual oils as well as refractory heavy distillates, including FCC decanted oils and lubricating oils. It also relates to the hydroprocessing of shale oils, oils from tar sands, and liquids derived from coals. The invention relates to a catalyst for the hydroprocessing of such hydrocarbonaceous feedstocks, the use of such catalysts, and the preparation of such catalysts.

In U.S. Ser. No. 527,414 filed Aug. 29,1983 (now U.S. Pat. No. 4,557,821), a parent application of the present application, a catalytic means of hydroprocessing heavy oils was revealed which employs a circulating slurry catalyst. The catalyst comprised a dispersed form of molybdenum disulfide prepared by reacting aqueous ammonia and molybdenum oxide to form an aqueous ammonium molybdate which was reacted with hydrogen sulfide to form a precursor slurry. The precursor slurry was mixed with feed oil, hydrogen and hydrogen sulfide and heated under certain conditions. A variety of dosages of hydrogen sulfide expressed as SCF of hydrogen sulfide per pound of molybdenum were taught to be useful in forming the precursor slurry (Column 3). From 2-8 SCF/LB were preferred (Column 4). It was found to be necessary to mix the slurry with oil in the presence of both hydrogen and hydrogen sulfide in order to obtain a catalytically active slurry catalyst (Columns 11-12). The oil-slurry mixture was then sulfided with hydrogen and hydrogen sulfide at at least two temperatures (Column 24) under certain conditions. The feed and catalyst, with water added were charged to the hydroprocessing reactor. Water introduction was deemed beneficial (Columns 26-27) for certain purposes, as was nickel addition to the slurry catalyst (Columns 42-44).

In U.S. Ser. No. 941,456 filed Dec. 15, 1986 (U.S. Pat. No. 4,857,496), a parent application of the present application, is described a sulfiding process in which there are two or three heating steps providing time-temperature sequences to complete the preparation of the final catalyst prior to flowing the feed to the higher temperature hydroprocessing reactor zone. Each sulfiding step was operated at a temperature higher than its predecessor. Ammonia was removed from an intermediate stage of catalyst preparation before the addition of feed oil and further sulfiding.

U.S. Ser. No. 767,760 filed Aug. 21, 1985 (U.S. Pat. No. 4,824,821) also a continuation-in-part of U.S. Ser. No. 527,414 filed Aug. 29, 1983 describes the promotion of a Group VIB slurry catalyst by the addition of a Group VIII metal such as nickel, or cobalt, to the aqueous ammonia compound after sulfiding is underway.

U.S. Ser. No. 767,768 filed Aug. 21, 1985 (U.S. Pat. No. 4,710,486) also a continuation-in-part of U.S. Ser. No. 527,414 filed Aug. 29, 1983 describes the specific regulation of the amount of sulfiding occurring in intermediate temperature sulfiding steps by stoichiometric replacement of oxygen associated with the Group VIB metal with sulfur up to fifty to ninety-five percent replacement. At least three stages of sulfiding were preferred with additional replacement of oxygen by sulfur in the high temperature step.

U.S. Ser. No. 767,821 filed Aug. 21, 1985 (U.S. Pat. No. 4,762,812) also a continuation-in-part of U.S. Ser. No. 527,414 filed Aug. 29, 1983 described a process for the recovery of spent molybdenum catalysts.

A parent application of the present application U.S. Ser. No. 275,235 filed Nov. 22, 1988 described a Group VIB metal sulfide slurry catalyst for hydroprocessing heavy oils or residual oil which has a pore volume in the 10-300 angstrom radius pore size range of at least 0.1 cc/g.

In U.S. Pat. No. 4,376,037 and U.S. Pat. No. 4,389,301 a heavy oil is hydrogenated in one or two stages by contacting the oil with hydrogen in the presence of added dispersed hydrogenation catalysts suspended in the oil, as well as in the additional presence of porous solid contact particles. In the two-stage version, the normally liquid product of the first stage is hydrogenated in a catalytic hydrogenation reactor. The dispersed catalyst can be added as an oil/water emulsion prepared by dispersing a water-soluble salt of one or more transition elements in oil. The porous contact particles are preferably inexpensive materials such as alumina, porous silica gel, and naturally occurring or treated clays. Examples of suitable transition metal compounds include $(NH_4)_2 MoO_4$, ammonium heptamolybdate and oxides and sulfides of iron, cobalt and nickel. The second reaction zone preferably contains a packed or fixed bed of catalysts, and the entire feed to the second reaction zone preferably passes upwardly through the second zone.

In U.S. Pat. No. 4,564,439 a heavy oil is converted to transportation fuel in a two-stage, close-coupled process, wherein the first stage is a hydrothermal treatment zone for the feed-stock mixed with dispersed demetalizing contact particles having coke-suppressing activity, and hydrogen; and the second stage closely coupled to the first, is a hydrocatalytic processing reactor.

The specifications of all of the foregoing U.S. patents and applications are incorporated herein by reference as if fully set forth in ipsis verbis.

Increasingly, petroleum refiners find a need to make use of heavier or poorer quality crude feedstocks in their processing. As that need increases the need also grows to process the fractions of those poorer feedstocks boiling at elevated temperatures, particularly those temperatures above 1000° F., and containing increasingly high levels of contaminants, such as undesirable metals, sulfur, and coke-forming precursors. These contaminants significantly interfere with the hydroprocessing of these heavier fractions by ordinary hydroprocessing means. The most common metal contaminants found in these hydrocarbon fractions include nickel, vanadium, and iron. The various metals deposit themselves on hydrocracking catalysts, tending to poison or de-activate those catalysts. Additionally, metals and asphaltenes, and coke-precursors can cause interstitial plugging of catalyst beds, reduce catalyst life, and run length. Moreover, asphaltenes also tend to reduce the susceptibility of hydrocarbons to desulfurization processes. Such de-activated or plugged catalyst beds are subject to premature replacement.

It would be advantageous to cure these problems with the least upset to conventional processing techniques and at the lowest cost. If, for example, dispersed, consumable catalysts are used, the catalyst should be effective at the lowest possible concentration to reduce the cost of catalytic treatment.

As a practical matter the run length and fixed bed resid desulfurization process is limited by coke and/or metals loadings of the catalyst. Improved fixed bed performance, catalyst life and improved 1000° F.+ conversions can be obtained by reducing the levels of metals and coke precursors which plug the pores and/or penetrate the catalyst pore volume containing active catalytic sites. The prior art teaches that the extension of run length in fixed bed resid desulfurization processes can be achieved by: increasing the size of the reactor; decreasing the feed rate; the use of macro-porous demetalation catalyst, especially in the top of the beds; or by the employment of either catalyst charging methods and/or operating procedures which distribute the metals evenly along the bed. Because demetalation is both a function of the metals content of the feedstock and the processing temperature, metals loading of fixed bed catalysts can be controlled by varying both catalyst activity and temperature along the reactor's length. Uniform axial metal deposition can be accomplished through the use catalyst beds which are graded by activity or by imposing temperature profiles in the bed which yield uniform metal deposition.

For the processing of heavy oils characterized by low hydrogen to carbon ratios (i.e. less than about ⅛ by weight) and high carbon residues, asphaltenes, nitrogen, sulfur and metal contaminant contents, it would be advantageous if the parameters for the preparation of a high activity slurry catalyst were known.

It would also be advantageous if the performance of existing fixed bed reactors could be increased by the use of slurry catalysts.

SUMMARY OF THE INVENTION

The present invention provides a process for the hydroprocessing of heavy hydrocarbonaceous oils containing metals and having low hydrogen to carbon ratios. The processing is accomplished by the use of a high activity catalyst which is prepared and dispersed as a slurry catalyst in the heavy oil. Preferably, the slurry catalyst is used at relatively low concentrations.

In particular, the process comprises introducing the heavy oil, an active catalyst slurry and a hydrogen-containing gas at elevated temperature and pressure into a fixed or ebulating bed of particulate hydrodesulfurization-hydrodemetalation catalyst at a temperature greater than about 700° F., preferably in upflow relationship to said bed. In our process the slurry catalyst is prepared by sulfiding an aqueous mixture of a Group VIB metal compound with a gas containing hydrogen sulfide to a dosage greater than 8 SCF of hydrogen sulfide per pound of Group VIB metal to form a slurry. Preferably a Group VIII metal compound is added to the slurry before mixing with the heavy feed oil. Separate porous contact particles can be added to the heavy oil feedstock.

In a two-stage process embodiment of the present invention, the heavy oil is contacted in a first-stage with the active catalyst slurry and hydrogen at a temperature and for a time sufficient to achieve measurable thermal cracking in the product stream. Then the effluent of the first-stage is contacted with a fixed or ebullated bed of desulfurization-demetalation catalyst and hydrogen gas in a second-stage. The second-stage catalyst bed may be graded by catalyst activity and/or temperature profile to promote uniform metal deposition, and preferably the effluent stream flows upwardly through the second-stage catalyst bed. In ebullating beds, the catalyst is graded by staged reactors. In our process the metals are deposited on the slurry catalyst and this catalyst provides the advantage of demetalation at lower levels of conversion of the 1000° F.+ fraction of the heavy oil.

Our process provides the advantage that when the 1000° F.+ conversion of the heavy feed oil is less than 70%, the coke yield is less than about 1.0%. Even at conversions as high as 90%, and at low slurry catalyst concentrations 100–1000 ppm), the coke yield is less than 2.5%.

BRIEF DESCRIPTION OF THE DRAWINGS

FIG. 1 graphs the amount of coke produced by the present invention and the amount of coke produced by a competitive process, as coke yield (weight percent), versus the amount of the 1000° F.+ fraction of residua converted to lighter products, as volume percent.

FIG. 2 graphs the percent of vanadium metal removed from residua by the present invention and a competitive process, versus the 1000° F.+ fraction conversion of the residua.

DETAILED DESCRIPTION OF THE PREFERRED EMBODIMENTS OF THE INVENTION

In preferred operation, as a two-stage process consisting of a slurry hydroprocessing stage followed by a fixed or ebullated bed desulfurization and demetalation process stage, the slurry hydroprocess is operated at temperatures above the incipient cracking temperature of the heavy oil, normally at temperatures above 700° F., preferably 800° to 960° F., and most preferably 830°–870° F. The second stage or desulfurization reactor is preferably operated in upflow mode to minimize the build-up of slurry catalyst in the bed. Superior performance is achieved in this process by bulk demetalation and carbon residue conversion in the slurry reactor or first stage prior to the heavy oil desulfurization process. Operation of the slurry reactor at temperatures above the incipient cracking temperature of the feed is preferred to achieve this demetalation and carbon residue reduction.

Slurry Hydroprocessing

The first stage or slurry hydroprocessing can be achieved in bubble up-flow reactors, coil crackers or ebullated bed reactors. Slurry catalyst systems consist of either small particles, or soluble compounds which yield small particles at reactor conditions dispersed in a feedstock. We distinguish several important types of slurry systems in heavy oil hydroprocessing. Basically, the small solid particles (having a diameter less than 20-50 microns) used in slurry systems can be either catalytically active or inactive for aromatic carbon hydrogenation, or can be auto-catalytic for demetalation, or combinations of the above.

Inactive slurry systems are particles which are inactive for aromatic carbon hydrogenation and denitrogenation. Some examples of these materials are mineral wastes and spent FCC catalysts or fines. A known mineral waste material for use in slurry systems is "red mud". In another embodiment of the present invention, porous contact particles (i.e. inactive) are separately added to the heavy oil feedstock prior to hydroprocessing. Examples of such porous contact particles include spent FCC catalyst particles, or fines.

Slurry catalyst systems can be produced during hydroprocessing by either thermal decomposition or reaction with hydrogen/hydrogen sulfide gas mixtures. These systems consist of either oil or water-soluble metal compounds. The water-soluble compound can be either mixed directly into the oil or emulsified with added surfactants. Generally the water-soluble compounds are preferred due to their lower cost when compared to the organic compounds.

Auto-catalytic slurry systems for demetalation reactions are exemplified by such materials as nickel/vanadium oxides or sulfides or oxysulfides which act as demetalation catalysts and can thus be classified as auto-catalytic materials. Addition of nickel and vanadium sulfides to the oil not only increases the demetalation reactions but also initiates the auto-catalytic demetalation reaction.

However, the Group VIB metal activated slurry catalyst of the present invention, preferably promoted by Group VIII metal compounds, provides a substantial improvement to a slurry catalyst system's hydrogenation, denitrogenation, carbon residue conversion and demetalation performance. The catalyst precursors prepared by the methods used in this invention are characterized by extremely small particle size distributions. The bulk of these particles are in the sub-micron range.

Active Slurry Catalysts

The activity of the Group VIB metal slurry catalyst is a function of the preparation conditions. The preferred Group VIB metal is molybdenum, but tungsten is also useful catalytically. Molybdenum is used herein for purposes of exemplification and does not exclude other Group VIB compounds. The high activity slurry catalyst used in the present invention is described in U.S. Ser. No. 548,157, filed Jul. 5, 1990, the disclosure of which has been incorporated by reference.

In an improved process for the preparation of molybdenum sulfide slurry catalyst, presulfiding of the aqueous solution formed by pretreatment of molybdenum oxide with aqueous ammonia is carried out with a dosage of from greater than 8 to about 14 SCF of hydrogen sulfide per pound of molybdenum. At this dosage of hydrogen sulfide it is not necessary to have hydrogen sulfide present in the recycle gas stream during hydroprocessing. Furthermore, the activation of the catalyst is achieved independent of the ratio of ammonia to molybdenum used to form the aqueous mixture.

When high catalyst activity is achieved by the sulfiding of the aqueous molybdenum at a hydrogen sulfide dosage greater than 8 SCF of hydrogen sulfide per pound of molybdenum, it is not necessary to use a mixture of hydrogen and hydrogen sulfide in the sulfiding step. In the latter event, i.e. in the absence of hydrogen, a dosage of from greater than 8 to about 10 SCF of hydrogen sulfide per pound of molybdenum is preferred. If hydrogen is present in the sulfiding step, a dosage of about 12-14 SCF of hydrogen sulfide per pound of molybdenum is preferred.

Catalyst activity is evident from increased hydrogen consumption, increased denitrogenation of the feedstock, increased desulfurization, demetalation, and increased conversion of the 1000° F.+ fraction of the feedstock. The sulfided molybdenum catalyst precursors are converted into slurry catalysts at elevated temperatures, i.e., greater than about 350° F., preferably greater than about 450° F. A catalyst so-treated will have a low coke yield over the course of a hydroprocessing run. Furthermore, at these hydrogen sulfide dosages, it is not necessary to have hydrogen sulfide present in the recycled gas stream during hydroprocessing.

The precursors which yield active catalysts are aqueous gels which appear as an elastic coherent mass consisting of an aqueous medium in which ultra-microscopic particles are either dispersed or arranged in a network. The activity is reasonably independent of the pH of the aqueous precursor gel. Optimum catalyst activity occurs when the catalyst precursor is presulfided at the point of incipient gel formation. While not limited by any theory of operation or mechanism, extending the sulfiding above this point produces thick gels which are difficult to disperse into the feedstock oil. Thick gels tend to yield large xerogels as the water is vaporized from the gel and the catalyst is transferred to the oil. Large xerogels tend to generate large solid particles when compared to those xerogels prepared from materials produced at the incipient gel formation point. A xerogel is defined as a gel containing little or none of the dispersion medium used.

To further enhance denitrogenation activity of the catalyst, it is preferred that a Group VIII metal compound be added to the slurry before mixing the slurry with heavy feed oil and hydroprocessing. Such metals are exemplified by nickel and cobalt. The weight percent of Group VIB metal added in the active slurry catalyst can range from 0.01 weight percent to 10 weight percent based on the weight of feedstock heavy oil. It is preferred that the catalyst concentration in the feed oil expressed as the weight percent of molybdenum range from about 100 ppm (0.01 weight percent) to about 10,000 ppm (1 weight percent) based on the weight of feed oil. The Group VIII metal, exemplified by nickel, is normally added in the form of the sulfate and preferably added to the slurry at incipient gel formation at a pH of about 10 or less. The preferred weight ratio of Group VIII metal to molybdenum is in the range of about 1:2 to 1:100.

Process Conditions

The process of the present invention operates in one or two stages. In one-stage operation the heavy oil is contacted with the active catalyst slurry and a hydrogen-containing gas at elevated temperatures and pressures and proceeds directly to a fixed or ebullated bed catalytic reactor with sufficient residence time in the catalystic reactor and at temperatures sufficient to achieve measurable thermal cracking rates. The process may be operated in two-stages where the first-stage comprises the contacting of the active catalyst slurry with the heavy oil and a hydrogen-containing gas with sufficient time and temperature in a thermal treatment reactor, such as a thermal coil or a bubble up-flow column or an ebullated reactor, to achieve reasonable thermal cracking rates. Such temperatures for heavy oil feedstocks are normally above about 700° F., preferably above 750° F.

The concentration of the active slurry catalyst in the heavy oil is normally from about 100 to 10,000 ppm expressed as weight of metal (molybdenum) to weight of heavy oil feedstock. Demetalation of the heavy oil to the extent of greater than 30% metals removal can be obtained even with less than 50% conversion of the 1000° F.+ fraction when the catalyst concentration is in this range, and surprisingly, even when the catalyst concentration is less than about 500 ppm, or even 200 ppm. If the 1000° F.+ conversion of the heavy oil is less than 70% the coke yield can be maintained at less than about 1%, and surprisingly, even at conversions as high as 90% and at low slurry catalyst concentrations (100-1000 ppm) the coke yield can be maintained at less than about 2.5 percent.

The process conditions for the second-stage or fixed bed reactor are typical of heavy oil desulfurization conditions except that the preferred flow regime is preferably co-current up-flow to minimize the build-up of solids in the bed. The second-stage reactor may be either a fixed, ebullated or a moving bed reactor. The catalyst used in the second stage reactor is a hydrodesulfurization-demetalation catalyst such as those containing a Group VIB and/or a Group VIII metal deposited on a refractory metal oxide. Examples of such catalysts are described in U.S. Pat. Nos. 4,456,701 and 4,466,574 incorporated herein by reference. The process conditions for typical one- and two-stage operations are listed in Table I.

TABLE I

| SLURRY HYDROPROCESSING STAGE | | |
|---|---|---|
| Reactor: | Thermal Coil | Bubble Up-Flow or Ebullated Bed |
| Flow Regime: | Bubble to Dispersed | — |
| Conditions (typical) | ← about 0.01 to about 10 → | |
| Catalyst to Oil Metal wt, percent: | | |
| Temperature: | 750-1000° F. | 750-875° F. |
| Pressure Total: | ← 500 to 4500 psig → | |
| H2 Pressure: | ← 200 to 4500 psi. → | |
| Recycle Gas Rate: | 500-2500 SCFB | 1500-15000 SCFB |
| LHSV, Vol/Hr/Vol: | — | 0.10-6.0 1/Hr |
| Coil Volume Cu.Ft/Bbl./Day: | 0.005-0.045 | — |

| FIXED BED HYDROPROCESSING STAGE | |
|---|---|
| Flow Regime: | Preferably Up-flow |

TABLE I-continued

| Conditions (typical) | |
|---|---|
| Temperature: | 625-810° F. |
| Total Pressure: | 1500-4500 psig |
| H2 Pressure: | 1000-4500 psi. |
| Recycle Gas Rate: | 1500-15000 SCFB |
| LHSV, Vol/Hr/Vol: | 0.10-2.0 1/Hr |

ACTIVE vs. INACTIVE SLURRY CATALYSTS

Quantities of coke greater than 2.5 weight percent based on fresh feed are often formed during thermal treatment of heavy oils. This coke can be held up in fixed bed reactors causing an undesirable increase in the pressure drop across the reactor, loss of catalytic activity and eventually leading to reactor shut down. It is therefore desirable to minimize the formation of coke in the fixed bed catalytic hydroprocessing reactor as well as in any thermal pretreatment which takes place prior to that stage.

The use of the active catalyst slurry of the present process in the thermal pretreatment stage results in a significant reduction in coke formation compared to pretreatment using other relatively inactive slurry catalysts, such as ammonium heptamolybdate. This is illustrated in the comparative examples of Table II. In Table II TCHC signifies a run made by the thermal catalytic hydroconversion (TCHC) process using a slurry catalyst which is the relatively inactive ammonium heptamolybdate In Table II, the process run labeled ACTIVE corresponds to the use of the active catalyst slurry of the present invention. In the thermal catalytic hydroconversion process (TCHC Table II) the relatively inactive slurry catalyst was an aqueous ammonium heptamolybdate mixed with a succinimide surfactant. The reactor used for the active process was a stirred autoclave having a length to diameter ratio of 2.6. The (TCHC) thermal catalytic hydroconversion studies were performed in an unstirred reactor having a length to diameter ratio of 20. The Maya feedstocks used in both studies were virtually identical with the possible exception of a small difference in the 1000° F.+ content. When Maya vacuum residuum is processed using the thermal catalytic hydroconversion process (TCHC) (e.g., U.S. Pat. No. 4,564,439; U.S. Pat. No. 4,761,220; U.S. Pat. No. 4,389,301), in a one-stage process which uses the comparatively inactive slurry catalyst, a coke yield of 4.5% is observed at 85% conversion of 1000° F+. When the active catalyst slurry of the present process is substituted for this relatively inactive catalyst, a coke yield of only 1.6% is observed at 88% conversion of 1000° F.+ fraction.

This reduction in coke yield is observed over a wide range of concentrations of slurry catalysts and thermal severities as illustrated in FIG. 1. In FIG. 1 coke yields for the process of the present invention and the TCHC process are compared over a wide range of thermal severities as indicated by 1000° F.+ conversion. The coke yield for the active slurry catalyst of the present processes is much less than that for the relatively inactive TCHC processing.

TABLE II

| Comparison of Products Produced via Slurry Hydroprocessing Using Active or Inactive (TCHC) Slurry Catalysts | | |
|---|---|---|
| Run Identification | ACTIVE | TCHC |
| Feed Properties | | |
| Feed Stock | Maya | Maya 975° F.+ |

TABLE II-continued

Comparison of Products Produced via Slurry Hydroprocessing Using Active or Inactive (TCHC) Slurry Catalysts

| Run Identification | | ACTIVE | TCHC |
|---|---|---|---|
| | | 900° F.+ | |
| Carbon | wgt % | 83.73 | 83.89 |
| Hydrogen | wgt % | 9.83 | 9.85 |
| Nitrogen | ppm | 7000 | 6900 |
| Sulfur | wgt % | 4.99 | 5.15 |
| Nickel | ppm | 118 | 112 |
| Vanadium | ppm | 590 | 600 |
| Run Conditions | | | |
| Temperature | °F. | 836 | 835 |
| Pressure | psig | 2402 | 2400 |
| Gas Recycle | scf/bbl | 7052 | 6500 |
| LHSV1 | vol/hr/vol | 0.10 | 0.39 |
| Slurry Catalyst | | | |
| Catalyst Conc. as ppm Mo | ppm | 1000 | 1000 |
| Nickel Conc. | ppm | 100 | 0 |
| Hydrogen Consumption | scf/bbl | 1949 | 1500 |
| Chemical Conversions From Oil | | | |
| 1000+ | vol % | 88 | 85 |
| Nitrogen | wgt % | 54 | 25 |
| Sulfur | wgt % | 80 | 70 |
| Nickel | wgt % | 96 | 89 |
| Vanadium | wgt % | 99 | 97 |
| Coke Yield | wgt % | 1.6 | 4.5 |

ACTIVE SLURRY CATALYSTS IN RESID HYDROPROCESSING

Catalyst life in fixed bed or ebullating bed resid hydroprocessing units is limited by metals or coke deposited on the catalyst. The deposited metals and coke plug the catalyst pores and decrease the catalyst activity for hydrogenation, desulfurization and carbon residue removal. Thus, the life of these catalysts can be increased by removing a portion of the metals and coke precursors. The demetalation and coke precursor removal can be achieved with an active slurry catalyst in which some of the metals are deposited on said slurry catalyst prior to contacting the heavy feed with the fixed bed or ebullating bed catalyst. Alternatively the demetalation can be achieved by the slurry catalyst within the fixed bed or ebullating bed hydroprocessing unit.

The following example illustrates the advantage of pretreating a high metals content heavy feed with an active slurry catalyst prior to feeding the residuum to a fixed bed hydroprocessing unit. The feedstock was an Arabian Heavy atmospheric resid having the inspections listed in Table III. Table IV lists the operating conditions and results when processing this feed containing an active slurry catalyst in a slurry reactor and in a two-stage system consisting of a slurry reactor followed by an upflow fixed bed reactor. For comparison purposes, the results obtained for processing the feed in a fixed bed reactor without the slurry catalyst are also included.

The slurry catalyst was prepared by sulfiding an aqueous ammonium molybdate solution containing 12 weight percent molybdenum and an ammonia to molybdenum weight ratio of 0.22 The solution was sulfided at 150° F. and 400 psig with a hydrogen-hydrogen sulfide gas mixture equal to 13.5 standard cubic feet of hydrogen sulfide per pound of molybdenum. Nickel sulfate solution was added to the resulting slurry to give a 0.1 nickel to molybdenum weight ratio. The slurry catalyst was dispersed into the feed oil at a 200 ppm level based upon the weight of molybdenum.

For both tests, the fixed bed reactors were charged with a graded catalyst system: 16.7 volume percent of Catalyst A containing 1.5% cobalt, 6% molybdenum, and 0.8% phosphorous on alumina; 16.7 volume percent of Catalyst B containing 1% cobalt, 3% molybdenum, and 0.4% phosphorous on alumina; and 66.6% volume percent of Catalyst C containing 3% nickel, 8% molybdenum and 1.8% phosphorous on alumina. The flow direction was upflow with Catalyst A placed at the bottom of the reactor. Catalyst B was placed above Catalyst A, and Catalyst C was placed above Catalyst B. Prior to use, the catalysts were sulfided. The slurry reactor was a one-liter autoclave equipped with a turbine to insure good mixing between the liquid, gas, and catalyst. Flow of the gas, oil, and catalyst was upward.

As can be seen in this example, the performance of the fixed bed unit is improved when coupled with a slurry reactor. The cracking conversion and the carbon residue conversion are markedly increased, thus resulting in more valuable products. Since a significant amount of nickel and vanadium were deposited on the active catalyst in the slurry reactor, the life of the fixed bed catalyst would be increased because of reduced amounts of metals being deposited.

One efficient method to increase the yield of distillate is to feed the heavy uncracked product from a hydroprocessing step to a delayed coker or fluid coker. In these processes, the heavy feed is cracked to light gases, distillates, and coke. Because the distillate products generally are more valuable than coke, it is desirable to minimize the amount of coke.

If the 1000° F.+ products from the above examples were sent to a delayed coker, the coke yield can be reduced by pretreating the feed using the active slurry catalyst prior to hydroprocessing in a fixed bed unit. Fixed bed hydroprocessing without the slurry catalyst pretreatment resulted in a 1000° F.+ product of 41.4 volume percent. With the active slurry catalyst, a yield of only 21.5 volume percent was obtained. These products contained 15.2% and 20.2% Conradson Carbon, respectively. Thus, the delayed coke yields from these 1000° F.+ products would be 10.1 weight percent and 6.9 weight percent, respectively, calculated on a basis of fresh feed to the hydroprocessing unit. The reduction in coke yield due to the pretreatment with the active slurry catalyst is thus 31%.

Among other advantages, Table II shows the capability of the process of the present invention to remove metals from heavy oils more efficaciously than the other process. The advantage in this superior metals removal is improved operations of the catalytic hydroprocessing second-stage due to increased catalyst life. Also the demetalation is realized at lower coke yields.

FIG. 2 illustrates clearly the difference between the present process and the thermal catalytic hydroconversion process. FIG. 2 illustrates that the active catalyst process of the present invention provides demetalation at lower levels of conversion than the inactive slurry catalyst process. Lower conversion leads to lower destabilization of the feed prior to catalytic hydroprocessing. The less severe the thermal treatment of the feed are more stable are the products obtained.

TABLE III

| Feed | | Arab Heavy Atmos. Resid |
|---|---|---|
| Nitrogen | ppm | 2824 |
| Sulfur | wgt % | 4.5 |

TABLE III-continued

| Feed | | Arab Heavy Atmos. Resid |
|---|---|---|
| Material boiling above 1000 F. | vol % | 55 |
| API Gravity | API° | 11.3 |
| Micro Carbon Residue | wgt % | 14.4 |
| Carbon | wgt % | 84.38 |
| Hydrogen | wgt % | 10.82 |
| Nickel | ppm | 27 |
| Vanadium | ppm | 100 |
| Iron | ppm | 3 |

TABLE IV

| | | Slurry | Slurry Plus Fixed Bed | Fixed Bed |
|---|---|---|---|---|
| Run Conditions | | | | |
| Slurry Catalyst Concentration, ppm[1] | | 200 | 200 | None |
| Slurry Reactor LHSV | Vol/Hr/Hr | 0.53 | 0.53 | — |
| Slurry Reactor Temperature | °F. | 822 | 822 | — |
| Fixed Bed LHSV | Vol/Hr/Vol | — | 0.37 | 0.34 |
| Fixed Bed Temperature | °F. | — | 723 | 718 |
| $H_2$ Partial Pressure | psia | 1720 | 1690 | 1901 |
| Recycle Gas | SCF/B | 5360 | 4570 | 5000 |
| $H_2$ Comsumption | SCF/B | 400 | 1189 | 850 |
| 1000° F. Cracking Conversion | Vol % | 50.0 | 60.9 | 24.8 |
| Liquid Yields | Vol % | | | |
| $C_5$-350° F. | | 4.4 | 9.8 | 1.8 |
| 350–500° F. | | 4.6 | 7.6 | 2.1 |
| 500–650° F. | | 10.7 | 16.2 | 3.7 |
| 650–1000° F. | | 52.9 | 48.9 | 53.7 |
| 1000° F.+ | | 27.5 | 21.5 | 41.4 |
| Total | | 100.1 | 104.0 | 102.7 |
| Conversions | | | | |
| Nitrogen | | 3.0 | 57.6 | 54.2 |
| Sulfur | | 29.8 | 87.2 | 86.9 |
| Carbon Residue | | 28.0 | 68.8 | 59.5 |
| Nickel | | 14.7 | 98.2 | 75.9 |
| Vanadium | | 44.4 | 99.5 | 90.5 |
| Calculated Delayed Coke Yield on Fresh Feed | Wt % | — | 6.9 | 10.1 |

[1]As Molybdenum

What is claimed is:

1. A process for the hydroprocessing of heavy hydrocarbonaceous oil containing metal contaminants comprises introducing said oil, an active catalyst slurry and a hydrogen-containing gas at elevated temperature and pressure into a fixed or ebullating bed of hydrodesulfurization-hydrodemetalation catalyst at temperatures greater than about 700° F.:
    wherein said active catalyst slurry is prepared by sulfiding an aqueous mixture of a Group VIB metal compound with a gas containing hydrogen sulfide to a dosage greater than 8 Standard Cubic Feet (SCF) of hydrogen sulfide per pound of Group VIB metal.

2. A process for the hydroprocessing of heavy hydrocarbonaceous oil containing metal contaminants comprises introducing said oil, an active catalyst slurry, porous contact particles, and a hydrogen-containing gas at elevated temperatures and pressures into in a fixed or ebullating bed of hydrodesulfurization-hydrodemetalation catalyst at temperatures greater than about 700° F.:
    wherein said active catalyst slurry is prepared by sulfiding an aqueous mixture of a Group VIB metal compound with a gas containing hydrogen sulfide to a dosage greater than 8 Standard Cubic Feet (SCF) of hydrogen sulfide per pound of Group VIB metal.

3. A process for the hydroprocessing of heavy hydrocarbonaceous oil containing metal contaminants comprises:
    (a) contacting said oil in a first stage with an active catalyst slurry and hydrogen at an elevated temperature and for a time sufficient to achieve measurable cracking and form a product stream; and
    (b) in a second stage, contacting said product stream with hydrogen in a fixed or ebullating bed of hydrodesulfurization-hydrodemetalation catalyst at temperatures greater than about 700° F.: wherein said active catalyst slurry is prepared by sulfiding an aqueous mixture of a Group VIB metal compound with a gas containing hydrogen sulfide to a dosage of from greater than about 8 Standard Cubic Feet (SCF) of hydrogen sulfide per pound of Group VIB metal.

4. A process according to claim 1, 2 or 3 wherein the oil flow is upward through said fixed bed.

5. A process according to claim 1, 2, or 3 wherein the conversion of the 1000° F.+ fraction of said heavy oil is less than 50 volume percent based on total of the 1000° F.+ fraction, the percent demetalation of nickel or vanadium is greater than 30 weight percent based on the total nickel and vanadium, and the slurry catalyst concentration is about 100–10,000 ppm in said heavy oil.

6. The process according to claim 1, 2, or 3 wherein the conversion of the 1000° F.+ fraction of said heavy oil is greater than 50 volume percent based on the total 1000° F.+ fraction, and the coke yield is less than about 2.5 weight percent based on said heavy oil, at a slurry catalyst concentration of about 100–10,000 ppm in said heavy oil.

7. A process according to claim 5 wherein the slurry catalyst concentration is less than abut 500 ppm.

8. A process according to claim 6 wherein the slurry catalyst concentration is less than about 500 ppm.

9. A process according to claim 1, 2, or 3 wherein said Group VIB metal is an oxide.

10. A process according to claim 1, 2, or 3 wherein said Group VIB metal is molybdenum.

11. A process according to claim 1, 2, or 3 wherein said Group VIB metal compound is molybdenum oxide.

12. A process according to claim 1, 2, or 3 wherein said Group VIB metal compound is an ammoniated salt.

13. A process according to claim 1, 2, or 3 wherein said Group VIB metal compound is an ammonium molybdate.

14. A process according to claim 1, 2, or 3 wherein said Group VIB metal compound aqueous mixture is obtained by treating a Group VIB metal oxide with aqueous ammonia.

15. A process according to claim 1, 2, or 3 wherein said Group VIB metal compound aqueous mixture is obtained by treating molybdenum oxide with aqueous ammonia.

16. A process according to claim 1, 2, or 3 wherein said elevated temperature is at least about the incipient cracking temperature of said heavy oil.

17. A process according to claim 1, 2, or 3 wherein prior to mixing with said heavy oil, said slurry is in the incipient gel stage.

18. A process according to claim 1, 2, or 3 wherein said sulfiding is performed with a gas containing a partial pressure of hydrogen and the dosage of hydrogen sulfide is in the range of about 12–14 SCF of hydrogen sulfide per pound of Group VIB metal.

19. A process according to claim 1, 2, or 3 wherein to said slurry is added a Group VIII metal compound.

20. A process according to claim 1, 2, or 3 wherein said sulfiding is performed in the absence of hydrogen and the dosage of hydrogen sulfide is in the range of from greater than 8 to about 10 SCF of hydrogen sulfide per pound of Group VIB metal.

21. A process according to claim 19 wherein said Group VIII metal compound is added to said slurry at a slurry pH less than about 10.

22. A process according to claim 19 wherein said Group VIII metal to Group VIB metal weight ratio is about 1:2 to about 1:1000.

23. A process according to claim 19 wherein said Group VIII metal is nickel.

24. A process according to claim 19 wherein said Group VIII metal is cobalt.

* * * * *